United States Patent [19]

Mitsuno et al.

[11] Patent Number: 4,764,546
[45] Date of Patent: Aug. 16, 1988

[54] FILLER-CONTAINING POLYPROPYLENE RESIN COMPOSITION AND PROCESS FOR PRODUCING THE SAME

[75] Inventors: Tatsuyuki Mitsuno; Hideo Shinonaga; Akio Daimon, all of Chiba, Japan

[73] Assignee: Sumitomo Chemical Co., Ltd., Osaka, Japan

[21] Appl. No.: 41,514

[22] Filed: Apr. 23, 1987

[30] Foreign Application Priority Data

Apr. 25, 1986 [JP] Japan ................................. 61-97593
May 14, 1986 [JP] Japan ................................. 61-111283

[51] Int. Cl.$^4$ .......................... C08K 3/34; C08K 9/06; C08L 35/00
[52] U.S. Cl. ................................. 523/213; 524/449; 524/451; 524/504; 524/517; 525/74; 525/207
[58] Field of Search ................. 524/449, 504, 517; 523/213; 525/74

[56] References Cited

U.S. PATENT DOCUMENTS

| 3,483,276 | 12/1969 | Mahlman ........................... 525/74 |
| 3,746,676 | 7/1973 | Joyner et al. ....................... 525/74 |
| 3,886,227 | 5/1975 | Van Brederode et al. ............ 525/74 |
| 4,604,421 | 8/1986 | Mitsuno et al. .................... 524/449 |
| 4,621,115 | 11/1986 | Morita et al. ..................... 524/504 |
| 4,663,369 | 5/1987 | Kawai et al. ....................... 524/504 |
| 4,686,257 | 7/1987 | Mitsuno et al. .................... 524/449 |

FOREIGN PATENT DOCUMENTS

| 213720A | 11/1987 | European Pat. Off. . | |
| 6149452 | 11/1981 | Japan ........................... 524/504 |
| 90036 | 6/1982 | Japan ........................... 523/213 |
| 49736 | 3/1983 | Japan ........................... 525/74 |
| 105042 | 1/1984 | Japan ........................... 524/445 |
| 1072041 | 4/1986 | Japan ........................... 525/74 |

Primary Examiner—John C. Bleutge
Assistant Examiner—David W. Woodward
Attorney, Agent, or Firm—Sughrue, Mion, Zinn, Macpeak & Seas

[57] ABSTRACT

A filler-containing polypropylene resin composition and a process for producing the same are disclosed. The composition comprises (a) from 27 to 87% by weight of a polypropylene resin, (b) from 3 to 15% by weight of a modified polypropylene resin containing from 0.1 to 3 mol % of an unsaturated dicarboxylic acid anhydride repeating unit, (c) from 5 to 30% by weight of an ethylene copolymer composed of from 82 to 98.7 mol % of an ethylene repeating unit, from 1 to 15 mol % of an ester repeating unit selected from alkyl acrylates and alkyl methacrylates having from 1 to 8 carbon atoms in the alkyl moiety thereof, and from 0.3 to 3 mol % of an unsaturated dicarboxylic acid anhydride repeating unit, and (d) from 5 to 40% by weight of a filler. The process comprises melt-mixing the components (a), (b) and (d) and then melt-mixing the resulting mixture with the component (c). The resin composition exhibits excellent finishing properties, such as adhesion, coating properties, and printability, as well as improved rigidity and thermal properties.

6 Claims, No Drawings

FILLER-CONTAINING POLYPROPYLENE RESIN COMPOSITION AND PROCESS FOR PRODUCING THE SAME

FIELD OF THE INVENTION

This invention relates to a filler-containing polypropylene resin composition and a process for producing the same. More particularly, it relates to a filler-containing polypropylene resin composition having improved finishing properties and a process for producing the same.

BACKGROUND OF THE INVENTION

In recent years, applications of filler-containing polypropylene resins to automobile parts and appliances have been markedly broadened because of their excellent mechanical and thermal properties.

In the application to automobile parts, for instance, interior parts, such as an instrument board, a trim, and a pillar-post, are often covered with non-woven fabric, foamed fabric, leather cloth made of polyvinyl chloride, and the like to produce an atmosphere of high-class. Further, there is noted a tendency to coat a bumper in color harmony with the body in a decorative style. In appliance parts, also, printing is commonly employed for decoration.

Polypropylene resins often find difficulty in finishing due to their poor adhesion or coating properties arising from non-polarity. It is well known to add fillers to polypropylene resins in order to improve these finishing properties. Incorporation of fillers improves finishing properties to some extent depending on the kind and amount of the filler, but such an improvement is still insufficient for practical use.

In order to further improve finishing properties, i.e., compatibility between polypropylene and adhesives or coatings, a medium called "primer", which typically comprises chlorinated polypropylene and toluene, etc., is usually provided therebetween. However, since the primer itself is expensive and an extra coating step is required, the cost of the final products is so increased. Therefore, further improvements have been demanded.

In an attempt to improve surface properties, physical or chemical etching of the surface of polypropylene molded products prior to adhesion has been studies and applied to practice. However, this process involves more complicated steps than the primer coating, and some conditions of etching cause deformation of molded products or produce insufficient effects.

In the case of coating, the process of coating a primer is being shifted to a process comprising oxidatively polarizing the surface of molded articles by irradiation with plasma to improve coating properties. Under the present situation, however, this process does not always achieve satisfactory results because the plasma irradiation should be effected in a batch system and the polarity obtained is non-uniform depending on the shape of the molded articles.

Attempts have also been made to impart polarity to polypropylene per se. For example, it has been proposed to modify polypropylene by grafting with an unsaturated carboxylic acid or an anhydride thereof, e.g., acrylic acid, maleic anhydride, etc., in the presence of an initiator, e.g., organic peroxides, or to blend the above-described modified polypropylene with unmodified polypropylene, as disclosed in Japanese Patent Application (OPI) No. 76149/75 (the term "OPI" as used herein means "unexamined published application"), Japanese Patent Publication No. 10264/77, etc.

According to these processes, the grafting is accompanied by decomposition of polypropylene with the peroxide so that the amount of the unsaturated carboxylic acid or the anhydride thereof to be incorporated is limited. As a result, the surface modifying effect attained is insufficient. If any effects are produced, mechanical properties are impaired due to molecular weight reduction of polypropylene.

In order to overcome these disadvantages associated with the conventional polypropylene resins, the present inventors proposed a composition comprising a polypropylene resin, an ethylene copolymer composed of an ethylene unit, an ester unit selected from alkyl acrylates and alkyl methacrylates, and an unsaturated dicarboxylic acid anhydride unit, and a filler, as disclosed in European Pat. No. 213,720A.

However, the aforesaid filler-containing polypropylene resin composition is insufficient in manifestation of the effects of fillers to improve rigidity and also exhibits unsatisfactory thermal properties, although surface modifying effects can be achieved as expected.

SUMMARY OF THE INVENTION

One object of this invention is to provide a filler-containing polypropylene resin composition having excellent finishing properties, such as adhesion, coating properties, printability, and the like, as well as improved mechanical and thermal properties.

Another object of this invention is to provide a process for producing such a filler-containing polypropylene resin composition.

The inventors have conducted extensive investigations on improvements of the above-described filler-containing polypropylene resin composition of European Pat. No. 213,720A. As a result, it has now been found that marked improvements on rigidity and thermal properties can be obtained by incorporating a modified polypropylene resin containing an unsaturated dicarboxylic acid anhydride repeating unit into the aforesaid composition.

The filler-containing polypropylene resin composition according to the present invention comprises
 (a) from 27 to 87% by weight of a polypropylene resin.
 (b) from 3 to 15% by weight of a modified polypropylene resin containing from 0.1 to 3 mol % of an unsaturated dicarboxylic acid anhydride repeating unit,
 (c) from 5 to 30% by weight of an ethylene copolymer composed of from 82 to 98.7 mol % of an ethylene repeating unit, from 1 to 15 mol % of an ester repeating unit selected from alkyl acrylates and alkyl methacrylates having from 1 to 8 carbon atoms in the alkyl moiety thereof, and from 0.3 to 3 mol % of an unsaturated dicarboxylic acid anhydride repeating unit, and
 (d) from 5 to 40% by weight of a filler.

The process for producing the above-described filler-containing polypropylene resin composition comprising components (a) to (d) comprises melt-mixing components (a), (b), and (d) to obtain (e) a mixture and then melt-mixing mixture (e) with component (c).

DETAILED DESCRIPTION OF THE INVENTION

The polypropylene resins which can be used in the present invention include crystalline polypropylene, crystalline propylene-ethylene block or random copolymers, crystalline propylene-α-olefin copolymers wherein the α-olefin has from 4 to 10 carbon atoms, and mixtures thereof.

The polypropylene resin usually has a melt index (as determined according to JIS K6758) ranging from 0.5 to 100, and preferably from 1 to 50, g/10 min.

The modified polypropylene resins which can be used as component (b) comprise the above-described polypropylene resin and from 0.1 to 3 mol % of an unsaturated dicarboxylic acid anhydride repeating unit. Monomers providing the unsaturated dicarboxylic acid anhydride repeating unit include maleic anhydride, citraconic anhydride, itaconic anhydride, tetrahydrophthalic anhydride, etc., with maleic anhydride being preferred.

If the content of the unsaturated dicarboxylic acid anhydride repeating unit in the component (b) is less than 0.1 mol %, effects of improving coating properties, printability, adhesion, and the like are not produced. If it exceeds 3 mol %, the amount of polar groups introduced becomes excessive to deteriorate compatibility with the polypropylene resin.

The modified polypropylene resin can be obtained by known techniques, such as a process in which a polypropylene resin is dissolved in an organic solvent and adding an unsaturated dicarboxylic acid anhydride and a radical generator thereto, followed by heating with stirring, and a process in which all the components are fed to an extruder to effect graft copolymerization.

Monomers providing the ethylene repeating unit in the ethylene copolymer of the present invention include methyl acrylate, ethyl acrylate, butyl acrylate, methyl methacrylate, ethyl methacrylate, 2-ethylhexyl methacrylate, butyl methacrylate, etc. (hereinafter referred to as unsaturated ester compounds).

The ester repeating unit is present in the ethylene copolymer in a proportion of from 1 to 15 mol %, and preferably from 3 to 12 mol %. Proportions out of this range deteriorate compatibility of the ethylene copolymer with the polypropylene resin or reduce the effects of improving mechanical characteristics, such as impact strength.

Monomers providing the unsaturated dicarboxylic acid anhydride repeating unit include maleic anhydride, citraconic anhydride, itaconic anhydride, tetrahydrophthalic anhydride, and the like, with maleic anhydride being particularly preferred.

The proportion of the unsaturated dicarboxylic acid anhydride repeating unit in the ethylene copolymer ranges from 0.3 to 3 mol %, and preferably from 0.5 to 2.8 mol %. With proportions lower than 0.3 mol %, the amount of polar groups which contribute to finishing is too small to produce satisfactory improving effects. Proportions higher than 3 mol % deteriorate compatibility with polypropylene resins due to excessively strong polarity.

Processes for producing the ethylene copolymer are not particularly restricted and include known processes, such as solution polymerization, emulsion polymerization, high-pressure bulk polymerization, and the like. Of these processes, the high-pressure polymerization technique is the most common, in which ethylene is copolymerized in the presence of a radical generator at a temperature of from 100° to 300° C. under a pressure of from 500 to 3000 atm. in the presence or absence of an appropriate solvent or a chain transfer agent. The high-pressure polymerization is suitably carried out by dissolving the above-described unsaturated dicarboxylic acid anhydride in the above-described unsaturated ester compound, elevating the solution in pressure by means of a pressure pump, and introducing the solution directly into a vessel type reactor or a tubular reactor. The thus obtained ethylene copolymer has a melt index (as determined according to JIS K6760) of from 0.5 to 800, and preferably from 1 to 200, g/10 min.

If the melt index of the ethylene copolymer is smaller than the above-recited lower limit, the ethylene copolymer lacks compatibility with the polypropylene resins. Melt indices higher than the upper limit greatly reduce rigidity, heat resistance or surface hardness of the resulting resin composition.

Fillers to be used in the present invention, either organic or inorganic, are not particularly restricted, and preferably include inorganic fillers, such as calcium carbonate, talc, clay, silica, diatomaceous earth, alumina, zinc white, magnesium oxide, mica, calcium sulfite, calcium sulfate, calcium silicate, glass powders, glass fibers (inclusive of silane-treated glass fibers), asbestos, gypsum fibers, and the like; and organic fillers, such as various kinds of woodmeals, cellulose fibers, melamine powders, and the like. These fillers may be used either individually or, if desired, in combination thereof. In view of a favorable balance of impact resistance and heat resistance of the resulting filler-containing polypropylene resin composition, talc and/or mica are preferably used as fillers.

If desired, the filler to be used in the present invention can be subjected to surface treatment to ensure a good balance between rigidity and impact strength. Examples of the surface treating agent to be used are organosilane compounds including vinyltriethoxysilane, vinyltris(β-methoxyethoxy)silane, γ-methacryloxypropyltrimethoxysilane, γ-aminopropyltriethoxysilane, γ-aminopropyltrimethoxysilane, N-(β-aminoethyl)-γ-aminopropyltrimethoxysilane, N-(β-aminoethyl)-γ-aminopropylmethyltrimethoxysilane, γ-glycidoxymethoxysilane, etc. Of these, N-(β-aminoethyl)-γ-aminopropyltrimethoxysilane and N-(β-aminoethyl)-γ-aminopropylmethyltrimethoxysilane are preferred because of their high reactivity to produce a filler-containing polypropylene resin composition of highest level in balance between rigidity and impact strength.

The surface treating agent is usually used in an amount of from 0.1 to 1.5 part by weight, and preferably from 0.3 to 1.0 part by weight, per 100 parts by weight of a filler. If the amount of the surface treating agent is less than 0.1 part by weight, the bonding strength between the component (a) and the components (b) and (d) is insufficient so that the effect of the filler to improve rigidity cannot be produced and the impact strength becomes inferior. If it exceeds the upper limit, the effect of the surface treating agent uneconomically comes to saturation. The surface treatment is preferably performed by the use of a ribbon mixer, a supermixer, etc.

The proportion of the component (a) in the composition of the present invention ranges from 27 to 87% by weight. If it is less than 27% by weight, heat resistance and rigidity as expected cannot be obtained. If it exceeds 87% by weight, the proportions of the components (b) and (c) are so small that adhesion and coating properties of the resulting composition are deteriorated and also the proportion of the component (d) is too small to exhibit rigidity.

The proportion of the component (b) in the composition ranges from 3 to 15% by weight, and preferably from 5 to 15% by weight. If it is less than 3% by weight, the effects of improving coating properties, printability, and adhesion are insubstantial. If it exceeds 15% by weight, physical properties, such as impact strength, are reduced.

The proportion of the component (c) in the composition ranges from 5 to 30% by weight, and preferably from 10 to 20% by weight. When it is less than 5% by weight, no substantial effects of improving adhesion, coating properties, and printability are produced. If it exceeds 30% by weight, the resulting composition has reduced physical properties, such as rigidity and heat resistance, and enjoys no further effects on finishing properties.

The proportions of the component (d) in the composition is from 5 to 40% by weight, and preferably from 10 to 40% by weight. If it is less than 5% by weight, improved rigidity that is an essential requirement of the composition according to the present invention cannot be ensured. On the other hand, proportions exceeding 40% by weight seriously reduce impact resistance of the composition, resulting in poor utility as materials for interior and exterior automobile parts. No further effects in improving thermal characteristics are produced by such an excessive filler.

In the preparation of the filler-containing polypropylene composition in accordance with the present invention, the components (a) to (d) may be melt-kneaded all at once, but in a preferred embodiment, the kneading is carried out in two divided steps. That is, the components (a), (b), and (d) are melt-mixed to prepare (e) a mixture in the first step. The mixture (e) is then melt-kneaded with the component (c) to obtain the resin composition of the present invention. By this embodiment, a good balance of physical properties of molded products can be further ensured.

If desired, the filler-containing polypropylene resin composition of the present invention can further contain various styrene-based elastomers, such as a styrene-butadiene random copolymer, a styrene-butadiene block copolymer, and hydrogenated products thereof; various polyolefin elastomers, such as a non-crystalline ethylene-propylene copolymer and an ethylene-propylenedicyclopentadiene copolymer; and, in addition, various functional group-containing polyolefins, such as a glycidyl group-containing ethylene copolymer; as long as various characteristics possessed by the resin composition of the invention are not substantially impaired.

The resin composition of the present invention can furthermore contain appropriate amounts of various additives, such as antioxidants, weathering agents, antistatics, foaming agents, colorants, and the like.

For mixing the components, apparatus commonly employed for plastics or rubbers, such as a Banbury mixer, a single-screw extruder, a twin-screw extruder, and a roll mill, can be used. Considering that the resin composition in a molten state shows adhesion to metal surfaces due to its polarity, mixing is desirably carried out by means of an extruder. In particular, an extruder having two or more feed zones is economically benificial because the first and second melt-kneading can be effected through one operation.

The resin composition obtained by the present invention can be molded into desired molded products by injection molding, extrusion molding, blow molding, etc., in a known manner.

The filler-containing polypropylene resin composition in accordance with the present invention possesses excellent finishing properties, such as adhesion, coating properties and printability, as well as excellent mechanical properties. In addition, the following advantages can be drawn from the resin composition of the present invention.

(1) The resin composition can produce injection molded products having a complicated shape and a small thickness under conventional molding conditions while substantially retaining flowability inherent to filler-containing polypropylene resins.

(2) The resin composition does not suffer from great reduction in mechanical characteristics, such as rigidity. In particular, the composition has markedly improved impact strength.

(3) Weldlines (a defect of molded products caused by incomplete fusion of two or more flows of molten resins) are not so conspicuous as in the case of using the conventional filler-containing polypropylene resins.

Since the filler-containing polypropylene resin compositions according to the present invention bring about excellent effects as set forth above, they can be utilized in the fields requiring finishing, such as adhesion, coating, and printing. Typical examples of their use include exterior parts of automobiles, e.g., a bumper, a bumper corner, etc., interior parts of automobiles, e.g., an instrument board, a meter case, a glove compartment, a console box, a trim, a pillar-post, etc., motorcycle parts, e.g., a fender, a leg seal, etc., and appliance parts, e.g., a lid of a washing machine, a body of a vacuum cleaner, a stand of an electric fan, a frame of a ventilating fan, etc.

This invention will now be illustrated in greater detail by way of the following examples, but it should be understood that they are not intended to limit the present invention. All the parts and percents in these examples are given by weight unless otherwise indicated.

In these examples, an ethylene copolymer as component (c) was prepared as follows:

Ethylene containing a small amount of propane as a chain transfer agent and maleic anhydride were dissolved in an unsaturated ester compound, and the solution was continuously fed under pressure to a 1.2 l-volume reaction vessel equipped with a stirrer. Copolymerization was effected at a temperature controlled to 180° C. under a pressure of 1600 kg/cm$^2$ at a rate of 1.5 to 3.2 kg/hr to obtain an ethylene copolymer.

Evaluations of physical properties of the resin compositions were made in accordance with the following test methods:

(1) Wet Tensile Strength:

Measured in accordance with JIS K6768-1977 at 23° C. Specimens under test were prepared by molding the resin composition into a plate of 150 mm×90 mm×2 mm by the use of an in-line screw type injection molding machine of 3.5 oz. (manufactured by Nissei Jushi Kogyo K.K.).

(2) Adhesive Strength:

The same specimen as used in (1) above was coated with about 150 g/m$^2$ of an adhesive comprising 97% by weight of G 250 (produced by Cemedine Co., Ltd.) and 3% by weight of Desmodur (produced by Bayer AG) with an air-spray gun, followed by heating at 80° C. for 2 minutes.

A skin material (PPX, produced by Toray Industries, Inc.) was heated at 110° C. for 2 minutes and, immediately thereafter, adhered to the adhesive-coated test plate under a planer pressure of 0.2 kg/cm². After the laminate was allowed to stand at 23° C. and 65±5% RH for 7 days, peel test was conducted to measure a peel strength.

(3) Initial Adhesion:

The same specimen as used in (1) above was cleaned with 1,1,1-trichloroethane vapors (74° C.) for 30 minutes, followed by drying at room temperature. A urethane coat (Flexthane® #101, produced by Nippon Bee Chemical Co., Ltd.) was directly spray-coated on the plate and then baked in an oven at 120° C. for 30 minutes.

The coating film was cross-hatched with a blade to make 2-millimeter squares (100 squares; 10 by 10). A 24 mm wide adhesive tape (Cellotape®, produced by Nichiban Co., Ltd.) was adhered thereon by pressing with fingers, and one end thereof was rapidly peeled off. The number of the squares remaining on the plate was counted to determine a percent remaining.

(4) Izod Impact Strength:

Measured in accordance with JIS K7110 at 23° C. The specimens were prepared by molding the resin composition by the use of an in-line screw type injection molding machine of 10 oz. (manufactured by Sumitomo Heavy Industries, Ltd.).

(5) Heat Deformation Temperature:

Measured in accordance with JIS K7202 at a bending stress of 4.6 kg/cm². The specimens were prepared in the same manner as in (4) above.

(6) Modulus in Flexure:

Measured in accordance with JIS K7203 at 23° C. The specimens were prepared in the same manner as in (4) above.

EXAMPLES 1 TO 5 AND COMPARATIVE EXAMPLES 1 TO 5

Ethylene copolymers (a) to (d) were prepared using maleic anhydride and an unsaturated ester compound as shown in Table 1 below.

TABLE 1

| Sample No. | Comonomer Content (mol %) | | | Melt Index (190° C., g/10 min) |
|---|---|---|---|---|
| | Maleic Anhydride | Unsaturated Ester Compound | | |
| (a) | 1.22 | butyl acrylate | 5.34 | 150 |
| (b) | 1.10 | 2-ethylhexyl methacrylate | 2.81 | 5 |
| (c) | 2.21 | ethyl acrylate | 7.52 | 41 |
| (d) | 1.95 | methyl methacrylate | 14.4 | 24 |

A polypropylene resin (Sumitomo Noblen® AW 564, a trade name for an ethylene/propylene block copolymer produced by Sumitomo Chemical Co., Ltd.; melt index: 8 g/10 min; ethylene content: 6%; ethylene content in the propylene/ethylene copolymer unit: 40%; intrinsic viscosity of the propylene/ethylene copolymer unit in a tetralin solution at 135° C.: 8 dl/g), a modified ethylene/propylene copolymer containing 0.3 mol % of maleic anhydride (ethylene content: 10%; hereinafter referred to as A), each of the ethylene copolymers (a) to (d), a filler [talc having a mean particle size (corresponding to a 50% cumulative distribution by sedimentation-type particle size distribution measurement) of 3.0 μm or mica having a mean particle size of 3.5 μm] were blended at a compounding ratio shown in Table 2, and 0.2 part of Irganox® 1010 (produced by Chiba-Geigy AG), 0.05 part of calcium stearate, and 0.05 part of Ultranox® 626 (produced by Borg-Warner Corp.) per 100 parts of the total amount of the aforesaid components were also blended in a dry blender.

The dry blend was melt-kneaded in a vented extruder having a diameter of 65 mm (L/D=28, manufactured by Ikegai Iron Works, Ltd.) at a die temperature of 220° C. to obtain a resin composition in the form of pellets.

Each of the resulting resin compositions was evaluated for physical properties according to the above-described test methods, and the results obtained are shown in Table 3.

As is apparent from the Table, the molded products obtained from the filler-containing polypropylene resin compositions according to the present invention exhibit excellent performance properties, such as adhesion, coating properties, and the like, as compared with the comparative samples.

TABLE 2

| Example No. | Polyproplene Resin | | Ethylene Copolymer | | Modified Polypropylene | | Filler | |
|---|---|---|---|---|---|---|---|---|
| | Kind | Amount (wt %) | Kind | Amount (wt %) | Kind | Amount (wt %) | Kind | Amount (wt %) |
| Example 1 | Sumitomo Noblen® AW 564 | 45 | (a) | 15 | A | 10 | talc | 30 |
| Example 2 | Sumitomo Noblen® AW 564 | 45 | (b) | 15 | A | 10 | " | 30 |
| Example 3 | Sumitomo Noblen® AW 564 | 45 | (c) | 15 | A | 10 | " | 30 |
| Example 4 | Sumitomo Noblen® AW 564 | 45 | (d) | 15 | A | 10 | " | 30 |
| Example 5 | Sumitomo Noblen® AW 564 | 45 | (c) | 15 | A | 10 | mica | 30 |
| Comparative Example 1 | Sumitomo Noblen® AW 564 | 70 | — | | — | | talc | 30 |
| Comparative Example 2 | Sumitomo Noblen® AW 564 | 50 | (a) | 15 | — | | " | 30 |
| Comparative Example 3 | Sumitomo Noblen® AW 564 | 60 | (b) | 15 | — | | " | 30 |
| Comparative Example 4 | Sumitomo Noblen® AW 564 | 60 | (c) | 15 | — | | " | 30 |
| Comparative Example 5 | Sumitomo Noblen® AW 564 | 60 | (d) | 15 | — | | " | 30 |

TABLE 3

| Example No. | Wet Tensile Strength (dyne/cm) | Adhesive Strength (g/25 mm) | Initial Adhesion (%) | Izod Impact Strength (kg · cm/cm) |
|---|---|---|---|---|
| Example 1 | 33 | 4200 | 100 | 8 |
| Example 2 | 33 | 4000 | 100 | 8 |
| Example 3 | 34 | 4500 | 100 | 9 |
| Example 4 | 34 | 4400 | 100 | 8 |
| Example 5 | 34 | 4500 | 100 | 6 |
| Comparative Example 1 | 29 | 1500 | 0 | 4 |
| Comparative Example 2 | 31 | 3400 | 70 | 8 |
| Comparative Example 3 | 31 | 3000 | 60 | 7 |
| Comparative Example 4 | 31 | 3500 | 90 | 8 |
| Comparative Example 5 | 31 | 3300 | 80 | 8 |

EXAMPLES 6 TO 22 AND COMPARATIVE EXAMPLE 6

Sumitomo Noblen ® AW564, a modified ethylene/propylene copolymer having 0.3 mol % of maleic anhydride (ethylene content: 10%; hereinafter referred to as PP-II), a modified ethylene/propylene copolymer having 0.05 mol % of maleic anhydride (ethylene content: 10%; hereinafter referred to as PP-III), each of the ethylene copolymers (a) to (d) as prepared in Example 1, a filler (talc having a mean particle size of 3.0 μm and/or mica having a particle size of 3.5 μm), a surface treating agent for the filler hereinafter described, and 0.02 part of Irganox ® 1010, 0.05 part of calcium stearate, and 0.05 part of Ultranox ® 626 per 100 parts of the total amount of the above-described components were blended in a dry blender. The resulting blend was melt-kneaded by means of the same extruder as used in Example 1 to obtain a filler-containing polypropylene resin composition.

The surface treating agent for the filler used was γ-aminopropyltriethoxysilane (TSL 8331), N-(β-aminoethyl)-γ-aminopropyltrimethoxysilane (TSL 8340), N-(β-aminoethyl)-γ-aminopropylmethyltrimethoxysilane (TSL 8345), γ-glycidoxypropyltrimethoxysilane (TSL 8350), or γ-methacryloxypropyltrimethoxysilane (TSL 8370), all produced by Toshiba Silicone K.K.

In Examples 6 and 7 and Comparative Example 6, all the above components were melt-kneaded at a compounding ratio shown in Table 4 through one step. In each of Examples 8 to 22, the components shown in the upper row of Table 4 were first melt-kneaded at a compounding ratio indicated therein to once obtain a pellet mixture, and the resulting mixture was then melt-kneaded with the components shown in the lower row of Table 4 at a compounding ratio shown therein. Taking Example 14 for instance, Sumitomo Noblen ® AW 564, PP-II, and talc having been treated with TSL 8340 (1% based on talc) were first melt-kneaded at a weight ratio of 55/5/30 to prepare a pellet mixture. In other words, the ratio of these three components based on 100 parts by weight of the resulting mixture was 61.1/5.6/33.3. The resulting pellet mixture was then melt-kneaded with the ethylene copolymer (c) at a weight ratio of 90/10.

Each of the resulting resin compositions was evaluated for physical properties, and the results obtained are shown in Table 5.

It can be seen from Table 5 that a good balance of physical properties can be ensured by kneading the compounding components in two divided steps.

TABLE 4

| Example No. | Polypropylene Resin Kind | Polypropylene Resin Amount (wt %) | Ethylene Copolymer Kind | Ethylene Copolymer Amount (wt %) | Modified Polypropylene Kind | Modified Polypropylene Amount (wt %) |
|---|---|---|---|---|---|---|
| Example 6 | AW 564 | 55 | (c) | 10 | PP-II | 5 |
| Example 7 | " | 55 | (c) | 10 | " | 5 |
| Example 8 | " | 55 | — | — | " | 5 |
|  |  |  | (c) | 10 |  |  |
| Example 9 | " | 55 | — | — | " | 5 |
|  |  |  | (c) | 10 |  |  |
| Example 10 | " | 55 | (c) | 10 | " | 5 |
| Example 11 | " | 59 | — | — | " | 1 |
|  |  |  | (c) | 10 |  |  |
| Example 12 | " | 45 | — | — | PP-III | 15 |
|  |  |  | (c) | 10 |  |  |
| Example 13 | " | 40 | — | — | PP-II | 20 |
|  |  |  | (c) | 10 |  |  |
| Example 14 | " | 55 | — | — | " | 5 |
|  |  |  | (c) | 10 |  |  |
| Example 15 | " | 55 | — | — | " | 5 |
|  |  |  | (c) | 10 |  |  |
| Example 16 | " | 55 | — | — | " | 5 |
|  |  |  | (c) | 10 |  |  |
| Example 17 | " | 55 | — | — | " | 5 |
|  |  |  | (c) | 10 |  |  |
| Example 18 | " | 55 | — | — | " | 5 |
|  |  |  | (c) | 10 |  |  |
| Example 19 | " | 50 | — | — | " | 10 |
|  |  |  | (c) | 10 |  |  |
| Example 20 | " | 50 | — | — | " | 10 |
|  |  |  | (a) | 10 |  |  |
| Example 21 | " | 50 | — | — | " | 10 |
|  |  |  | (b) | 10 |  |  |
| Example 22 | " | 50 | — | — | " | 10 |
|  |  |  | (d) | 10 |  |  |
| Comparative Example 6 | " | 70 | (c) | — | — | — |

| Example No. | Filler Kind | Filler Amount (wt %) | Kind | Amount (wt %) | Surface Treating Agent Kind | Amount (wt %*) |
|---|---|---|---|---|---|---|

TABLE 4-continued

| Example No. | Filler 1 | Amount | Filler 2 | Amount | Silane | Amount* |
|---|---|---|---|---|---|---|
| Example 6 | talc | 30 | — | — | — | — |
| Example 7 | " | 30 | — | — | TSL8340 | 1.0 |
| Example 8 | " | 30 | — | — | " | 0.03 |
| Example 9 | " | 30 | — | — | " | 2.5 |
| Example 10 | — | — | — | — | — | — |
|  | talc | 30 | — | — | TSL8340 | 1.0 |
| Example 11 | " | 30 | — | — | " | 1.0 |
| Example 12 | " | 30 | — | — | " | 1.0 |
| Example 13 | " | 30 | — | — | " | 1.0 |
| Example 14 | " | 30 | — | — | " | 1.0 |
| Example 15 | " | 30 | — | — | TSL8345 | 1.0 |
| Example 16 | " | 30 | — | — | TSL8331 | 1.0 |
| Example 17 | " | 30 | — | — | TSL8350 | 1.0 |
| Example 18 | " | 30 | — | — | TSL8370 | 1.0 |
| Example 19 | " | 25 | mica | 5 | TSL8340 | 1.0 |
| Example 20 | " | 25 | " | 5 | " | 1.0 |
| Example 21 | " | 25 | " | 5 | " | 1.0 |
| Example 22 | " | 25 | " | 5 | " | 1.0 |
| Comparative Example 6 | talc | 30 | — | — | — | — |

Note: *Based on the filler or fillers.

TABLE 5

| Example No. | Wet Tensile Strength (dyne/cm) | Adhesive Strength (g/25 mm) | Initial Adhesion (%) | Izod Impact Strength (kg·cm/cm) | Heat Deformation Temperature (°C.) | Modulus in Flexture (kg/cm$^2$) |
|---|---|---|---|---|---|---|
| Example 6 | 32 | 3600 | 100 | 7 | 101 | 11500 |
| Example 7 | 32 | 3600 | 100 | 7 | 108 | 13300 |
| Example 8 | 32 | 3600 | 100 | 7 | 108 | 13500 |
| Example 9 | 32 | 3600 | 100 | 10 | 129 | 18500 |
| Example 10 | 32 | 3600 | 100 | 7 | 108 | 13300 |
| Example 11 | 32 | 3400 | 100 | 7 | 108 | 13100 |
| Example 12 | 32 | 3400 | 100 | 7 | 108 | 13500 |
| Example 13 | 33 | 4400 | 100 | 10 | 130 | 18800 |
| Example 14 | 32 | 3600 | 100 | 8 | 127 | 17200 |
| Example 15 | 32 | 3600 | 100 | 8 | 127 | 17000 |
| Example 16 | 32 | 3700 | 100 | 8 | 123 | 16100 |
| Example 17 | 32 | 3600 | 100 | 8 | 109 | 14200 |
| Example 18 | 32 | 3500 | 100 | 7 | 112 | 14800 |
| Example 19 | 33 | 4700 | 100 | 8 | 129 | 21100 |
| Example 20 | 33 | 4500 | 100 | 8 | 129 | 20500 |
| Example 21 | 33 | 4500 | 100 | 8 | 132 | 22000 |
| Example 22 | 34 | 4800 | 100 | 8 | 130 | 21500 |
| Comparative Example 6 | 29 | 1500 | 0 | 4 | 137 | 12800 |

As described above, the filler-containing polypropylene resin compositions according to the present invention and molded products obtained therefrom have improved finishing properties, such as adhesion, coating properties, and printability, combined with impact resistance and heat resistance, as compared with the conventional compositions.

While the invention has been described in detail and with reference to specific embodiments thereof, it will be apparent to one skilled in the art that various changes and modifications can be made therein without departing from the spirit and scope thereof.

What is claimed is:

1. A filler-containing polypropylene resin composition comprising:
   (a) from 27 to 87% by weight of a polypropylene resin,
   (b) from 3 to 15% by weight of a modified polypropylene resin containing from 0.1 to 3 mol % of an unsaturated dicarboxylic acid anhydride repeating unit,
   (c) from 5 to 30% by weight of an ethylene copolymer composed of from 82 to 98.7 mol % of an ethylene repeating unit, from 1 to 15 mol % of an ester repeating unit selected from alkyl acrylates and alkyl methacrylates having from 1 to 8 carbon atoms in the alkyl moiety thereof, and from 0.3 to 3 mol % of an unsaturated dicarboxylic acid anhydride repeating unit, and
   (d) from 5 to 40% by weight of a filler.

2. A filler-containing polypropylene resin composition as in claim 1, wherein said unsaturated dicarboxylic acid anhydride repeating unit in the component (b) is a maleic anhydride repeating unit.

3. A filler-containing polypropylene resin composition as in claim 1, wherein said unsaturated dicarboxylic acid anhydride repeating unit in the component (c) is a maleic anhydride repeating unit.

4. A filler-containing polypropylene resin composition as in claim 1, wherein said filler is selected form the group consisting of talc, mica and mixture thereof.

5. A filler-containing polypropylene resin as in claim 1, wherein said filler has been treated with from 0.05 to 2% by weight of an aminosilane compound based on the filler.

6. A filler-containing polypropylene resin as in claim 5, wherein said aminosilane compound is selected form the group consisting of N-(β-aminoethyl)-γ-aminopropyltrimethoxylsilane, N-(β-aminoethyl)-γ-aminopropylmethyl-trimethyoxysilane and mixtures thereof.

* * * * *